United States Patent [19]
Hamling

[11] 3,875,971
[45] Apr. 8, 1975

[54] CERAMIC COATED ARTICLES
[75] Inventor: Bernard H. Hamling, Warwick, N.Y.
[73] Assignee: Union Carbide Corporation, New York, N.Y.
[22] Filed: Oct. 5, 1972
[21] Appl. No.: 295,233

Related U.S. Application Data
[62] Division of Ser. No. 36,443, May 11, 1970, Pat. No. 3,709,717.

[52] U.S. Cl. ............... 138/146; 106/57; 117/70 C; 117/127; 161/35; 161/47; 161/139; 161/196; 161/225
[51] Int. Cl. ........................................... C04b 25/48
[58] Field of Search .......... 161/139, 225, 192, 196; 106/46, 48, 57, 73.5; 117/46, 52, 70 C, 129, 135, 127, 169, 125, 215, 221, 230, 70 C, , 70 A, 71 M; 29/573; 138/141, 143, 145, 146

[56] References Cited
UNITED STATES PATENTS

| | | | |
|---|---|---|---|
| 2,851,376 | 9/1958 | Adlassnig | 117/70 C |
| 2,991,200 | 7/1961 | Sheridan et al. | 106/57 |
| 3,385,915 | 5/1968 | Hamling | 106/57 |
| 3,434,854 | 3/1969 | Voss | 106/57 |
| 3,471,413 | 10/1969 | Hervert | 117/70 C |
| 3,510,343 | 5/1970 | Twells | 117/125 |
| 3,533,815 | 10/1970 | Baldwin | 106/57 |
| 3,709,706 | 1/1973 | Sowman | 106/57 |

*Primary Examiner*—George F. Lesmes
*Assistant Examiner*—Paul J. Thibodeau
*Attorney, Agent, or Firm*—Israel Blum

[57] ABSTRACT

Ceramic coated articles are prepared which comprise metal articles coated with zirconia wherein the bond between the metal and the zirconia is effected by porcelain enamel. The ceramic coated articles are prepared by contacting zirconia with a metal article coated with porcelain enamel, fusing the porcelain enamel while maintaining contact between the zirconia and the porcelain, and then solififying the porcelain. The ceramic coated articles of the invention have enhanced utility in hot and/or corrosive environments.

3 Claims, No Drawings

CERAMIC COATED ARTICLES

This is a division of application Ser. No. 36,443 filed May 11, 1970 now U.S. Pat. No. 3,709,717.

The invention relates to ceramic coated articles. In one aspect, the invention relates to a method for coating metal articles with zirconia. In another aspect, the invention relates to the zirconia coated metal articles that can be produced by the method of the invention.

In U.S. Pat. No. 3,385,915, entitled "Process for Producing Metal Oxide Fibers, Textiles and Shapes" (the disclosure of which is incorporated herein by reference), there is disclosed, inter alia, a process for the production of fibrous zirconia. The present invention relates to a process for preparing ceramic coated articles utilizing zirconia, and preferably, the fibrous zirconia that can be produced by said patent.

Zirconia has utility, for example, as thermal insulation elements for use at high temperatures and in corrosive atmospheres. In some cases, in order to fully realize the potential of such utility, it is desirable to form composites of zirconia and other materials such as metals. Such composites would desirably have a relatively strong adhesive bond between the zirconia and the substrate metal. Zirconia, alone, does not form an adhesive bond to metal. Thus, some type of bonding agent is desired in order to effect an adhesive bond between zirconia and metal. It was attempted to employ known refractory cements as a means for effecting an adhesive bond between metal and zirconia. For instance, a cement comprising a mixture of powdered zirconia and zircon with an aqueous solution of sodium silicate was employed as a bonding agent. While the adhesion between the metal and zirconia was improved somewhat, the degree of improvement was not sufficient to enable the resulting articles to withstand thermal shock.

The present invention is based upon the discovery that porcelain enamels can be employed as the bonding agent between metal and zirconia. Thus, zirconia coated metal articles can be produced utilizing porcelain enamel as the bonding agent. The resulting ceramic coated metal articles have enhanced utility, for instance, in hot corrosive environments such as in molten aluminum. The adhesion of the metal to the zirconia, and thus the protection of the metal from corrosion which is afforded by the zirconia, is maintained through repeated thermal shocks such as would be obtained by repeated immersion of a thermocouple protection tube in molten aluminum.

It is an object of the invention to provide ceramic coated metal articles having enhanced utility for use in hot and/or corrosive environments.

It is another object of the invention to provide a method for effecting a bond between metal and zirconia.

It is still another object of the invention to provide zirconia coated metal articles, and particularly, fibrous zirconia coated metal articles.

A further object of the invention is to provide fibrous zirconia/porcelain enamel/metal composites and a method for making them.

Still further objects of the invention will be apparent from a reading of the accompanying specification.

The process of the invention comprises contacting zirconia with porcelain enamel coated on metal, fusing the porcelain while maintaining contact between the porcelain and the zirconia, and then solidifying the porcelain. The process establishes a bond between the zirconia and the porcelain enamel with the result that the zirconia is effectively bonded to the metal.

The zirconia that is employed in the invention can be fibrous zirconia, which is preferably prepared by the process disclosed in the above mentioned Hamling U.S. Pat. No. 3,385,915. The fibrous zirconia can be in the form of loose fibers, yarn, rovings, paper, felt, mats, woven textiles, knitted textiles, or the like. Preferably, the zirconia contains a small proportion of a stabilizer metal oxide in order to stabilize the zirconia, for example, in the tetragonal form. Such principle is known, and is disclosed, for example, in my copending application Ser. No. 700,031, entitled "Stabilized Tetragonal Zirconia Fibers and Textiles", filed on Jan. 24, 1968 now abandoned, the disclosure of which is incorporated herein by reference. The preferred stabilizer oxide is yttria, although other stabilizer oxides can be employed if desired. Zirconia in other forms can also be employed in the invention. In one preferred aspect of the invention, the zirconia portion of the ceramic coated articles comprises fibrous zirconia in a matrix of non-fibrous zirconia.

In selecting a metal to be bonded to zirconia, it is desirable in some cases to employ a metal that has a coefficient of thermal expansion approximately the same as that of zirconia. Over a temperature range of from about room temperature to about 2,000°F., zirconia has a coefficient of thermal expansion of from about 5.2 to about 5.8 × $10^{-6}$ in/in-°F. (9.5 to $10^{-6}$ cm/cm-°C.) The following table lists typical metal and metal alloys which can desirably be employed in the present invention because of the proximity of their coefficients of thermal expansion to zirconia:

TABLE I

Typical Metals and Alloys Which Have a Coefficient of Thermal Expansion Close to that of Fibrous Zirconia

| Metal or Alloy | $K_F$, in/in/°F × $10^6$ |
|---|---|
| Carbon Steel, SAE | 6.7 |
| Wrought Iron | 6.35 |
| Wrought Steel, Type 17–4 PH | 6.0 |
| Wrought Steel, Type 17-7 PH | 5.6 |
| Wrought Steel, Type PH 15 – 7 MO | 5.6 |
| Irgot Iron | 6.8 |
| Cast Gray Iron | 6.7 |
| Malleable Iron | 6.6 |
| Ni-resist, Type 3 | 5.3 |
| Stainless Steel, Type 410 | 5.5 |
| " Type 414 | 6.1 |
| " Type 420 | 5.7 |
| " Type 430 | 6.0 |
| " Type 431 | 6.5 |
| " Type 443 | 6.3 |
| " Type 446 | 5.8 |
| " Type W | 5.5 |
| High Silicon Steel - Silal | 6.0 |

The foregoing metals are merely illustrative of some of the metals that can be used in the invention. Metals having coefficients of thermal expansion significantly different from that of zirconia can also be employed in the invention because of the excellent bond achieved between the porcelain enamel and the zirconia.

Table I, above, exemplifies a wide variety of ferrous metals that can be employed as substrates in the invention. The invention is not limited to the use of ferrous metals, however. For instance, the utility of many high temperature metals and alloys is enhanced by the corrosion resistance of the zirconia coating of the invention. Such metals include chromium, nickel, cobalt, molybdenum, tungsten, tantalum, zirconium, and the like, as well as alloys containing these metals. Specific illustrative useful alloys include Inconel X-750, Hastelloy X, Haynes Alloy 25, nichrome, and the nickel and/or chromium based "super alloys" in general. Iron, cobalt, nickel, and alloys thereof are especially useful in the invention.

The zirconia is bonded to metal by the use of porcelain enamel. By the term "porcelain enamel" is meant "a substantially vitreous or glassy, inorganic coating bonded to metal by fusion at a temperature above 800°F." (This is the definition that has been adopted by the American Society for Testing and Materials; ref., "1964 Book of ASTM Standards," Part 13, Refractories; Glass, Ceramic Materials, American Society for Testing and Materials, 1964, p. 498.)

The criteria for the selection of a particular porcelain enamel for a particular metal substrate are known in the art. For instance, reference is made to the article on "Enamels, Porcelain or Vitreous" appearing on pages 155–173 of Vol. 8 of the Kirk-Othmer "Encyclopedia of Chemical Technology," Interscience Publishers (1952), incorporated herein by reference. For the purposes of the present invention, wherein it is contemplated that the ceramic coated metal articles of the invention will be especially suitable for high temperature use, the porcelain enamel selected should have a melting point (or, more properly, a softening point) above the intended use temperature. (Of course, if means are provided for cooling the substrate metal, the surface of the zirconia can be exposed to temperatures much higher than the softening temperature of the porcelain.) The coefficient of thermal expansion of the porcelain enamel preferably should substantially match that of the substrate metal. The factors to be considered in accomplishing this result are known. For instance, see pages 163–166 of the Kirk-Othmer reference cited above. Pretreatment of the metal substrate, such as degreasing, removal of oxide scale, and the like, prior to coating with the porcelain enamel is highly preferred in most cases.

One preferred type of porcelain enamels are the ceramic coatings for high temperature alloys developed by the National Bureau of Standards. These coatings are disclosed, for instance, in the following publications:

ASTM Bulletin 145, Mar. 1947, pages 59–62;

"Recent Ceramic Coatings for High-Temperature Alloys." The Technical News Bulletin of the National Bureau of Standards, October 1951;

"Ceramic Coatings for the high-temperature protection of Steel," Harrison et al., J. Research NBS 38, 293 (1947) RP 1773;

"High Temperature Protection of Mild Steels," Harrison et al., Steel 120 (6), 92 (Feb. 10, 1947); and "High Temperature Ceramic Coatings for Molybdenum," NBS Tech. News Bull. 32, 125 (Nov. 1948).

The disclosures of the foregoing publications are incorporated herein by reference.

One specific preferred enamel for use with Inconel, Inconel X, Nimonic 75, type 310 stainless steels, and similar alloys for applications up to 1,750°F. is the following enamel, designated as NBS A-418 which is composed of a frit (332) and filler phase. The composition of frit 332 and NBS A-418 enamel is:

| Frit 332 | $SiO_2$ | 37.5 | weight per cent |
|---|---|---|---|
| | BaO | 44.0 | |
| | $B_2O_3$ | 6.5 | |
| | CaO | 3.5 | |
| | ZnO | 5.0 | |
| | $Al_2O_3$ | 1.0 | |
| | $ZrO_2$ | 2 .5 | |
| | | 100.0 | |

NBS A-418

| Frit 332 | 70 parts by weight |
|---|---|
| $Cr_2O_3$ | 30 |
| Enameler's clay | 5 |
| Water | 48 |

The process of the invention is carried out by fusing a porcelain enamel coated on a metal while maintaining the enamel in contact with zirconia, and thereafter solidifying the enamel. The temperature employed for fusing the enamel varies with the nature of the enamel, as is well known in the art. For instance, with the enamel NBS A-418 mentioned above, a temperature of at least about 1,875°F. is required. Firing time for this particular enamel is normally from about 3 to 10 minutes at a temperature of 1,875° to 1,880°F. The firing times vary somewhat, depending on factors such as the heat capacity of the oven, the mass of the substrate metal, and the like.

The enamel can be fired to its vitreous phase either before or after being contacted with the zirconia. In the former case, it is re-fused while being maintained in contact with the zirconia, and then cooled to re-solidify the enamel and establish a bond with the zirconia. The firing times employed in the process of the invention can be those standard in the art for firing porcelain enamels (in the case where the enamel is not fired until it is contacted with the zirconia). Where the porcelain enamel has been vitrified prior to contact with zirconia, the firing time need only be long enough to re-fuse the enamel. This time is normally only a matter of a few minutes, and will be apparent to those skilled in the art.

The re-solidification of the enamel can be carried out simply by removing the ceramic coated article from the firing oven or other heat source, and allowing the article to cool in air. Cooling rates have not been found to be narrowly critical.

In one preferred aspect of the invention, the zirconia that is employed is fibrous zirconia impregnated with a zirconia cement, which is preferably stabilized in order to maintain the zirconia in the cubic or tetragonal form. The preparation of such zirconia cements is disclosed in my U.S. Pat. No. 3,736,160 entitled "Fibrous Zirconia/Cement Composites," which is being filed on the same day as this application. The disclosure of said patent is incorporated herein by reference. The fibrous zirconia can be impregnated with the zirconia cement either before or after the fibrous zirconia is contacted with the porcelain enamel for the purpose of forming a bond between said fibrous zirconia and said enamel.

The zirconia coated metal articles that are prepared in accordance with the invention wherein the zirconia is fibrous zirconia impregnated with the above discussed zirconia cement comprise a preferred aspect of the invention. The zirconia structure in this aspect of the invention comprises a fibrous network contributed by the fibrous zirconia in a matrix of microporous zirconia. The matrix phase serves to harden the zirconia fibers to thereby yield significantly improved mechanical properties. The pore structure of the matrix phase is extremely fine, for instance, the pore network has an average diameter of less than about 5 or 6 microns. The porous nature of the zirconia matrix imparts excellent thermal shock resistance to the composites. However, the pore network is sufficiently fine to prevent materials such as molten aluminum (which does not wet zirconia) from penetrating the zirconia coating to thereby attack the porcelain and metal. For this reason, one very valuable utility of the ceramic coated articles of the invention when prepared in accordance with this desirable aspect is the preparation of objects that are to come into contact with molten aluminum. Thus, thermocouple shields for use in molten aluminum, crucibles for containing molten aluminum, pouring spouts and transfer pipes for molten aluminum, can be fabricated from these ceramic coated articles of the invention.

When the fibrous zirconia that is employed in the invention is impregnated with a zirconia cement, the process is modified to a limited extent, as discussed below. The zirconia cement employed comprises a liquid containing a zirconium compound (preferably an aqueous solution of a zirconium compound such as zirconium hydroxychloride or zirconium acetate, and which preferably contains a compound that forms a stabilizer oxide, such as yttrium chloride or yttrium acetate which form yttrium oxide) and a refractory powder, preferably yttria-stabilized zirconia, the powder preferably being of sub-micron size. The preparation of submicron size refractory metal oxide powders which can be used in the zirconia cement is disclosed in an application entitled "Finely Divided Metal Oxides and Sintered Objects Therefrom, Ser. No. 36,442," filed on the same day as this application and now abandoned in the names of B. H. Hamling and A. W. Naumann, and assigned to the same assignee as this application. The disclosure of said application is incorporated herein by reference.

When the zirconia cement impregnated fibrous zirconia is employed in the invention, the zirconia/porcelain/metal composite must be subjected to a temperature sufficient to insure transformation of the zirconium compound in the liquid portion of the cement to zirconia. Decomposition of the zirconium compound normally begins at about 250° to 300°F., and is normally complete at 1,100° to 1,500°F. Where the composite must be heated to temperatures above 1,500°F. in order to fuse the particular porcelain enamel employed, such higher temperatures are not detrimental to the "curing" of the zirconia cement.

In one desirable mode of practicing the invention, wherein the liquid portion of the zirconia cement is a solution of a zirconium compound (preferably an aqueous solution), the composite can first be dried at about 190° to 212°F. (if the composite is at atmospheric pressure), or at about 250° to 300°F. (if the composite is held under pressure), to form a composite having sufficient green strength to be handled. (Of course, the drying should be carried out so as to permit escape of volatiles.) Thereafter, the composite can be subjected to higher temperatures in order to cure the cement and fuse the porcelain enamel.

The non-limiting examples which follow illustrate certain aspects of the invention.

Example 1

Representative Preparation Of Zirconia Cement

A. Representative Preferred Method of Preparing Liquid Component

Basic zirconium chloride (ZrOOHCl), also called zirconium hydroxychloride, such as that sold by TAM Division of National Lead, as an aqueous solution is used. The purchased solution has the following properties:

| Solids content | Other Elements | |
|---|---|---|
| $ZrO_2$ content 234 g/l | Chloride | 69.0 gm/l |
| Viscosity 17.5 cps at 25.0 °C | $Fe_2O_3$ | .03 gm/l |
| pH 0.4 at 25°C | $SiO_2$ | |
| Color slightly amber | | |
| Sp. Gr. 1.26 at 25°C | | |

It is concentrated further by evaporation to the following composition:

| Sp. Gr. | 1.65 |
|---|---|
| $ZrO_2$ content | 586 g/l |
| Viscosity | 70 cps at 25.5 °C |

To the concentrated solution is added yttria stabilizer in the form of yttrium chloride, $YCl_3$. This salt may be purchased commercially, or it can be prepared by reacting the oxide $Y_2O_3$ with a stoichimetric quantity of HCl. The $YCl_3$ solution is made up to a Sp. Gr. of 1.43 and has a $Y_2O_3$ content of 264 gm/liter. 150 ml of $YCl_3$ solution is mixed with 1.0 liter of ZrOOHCl solution. A typical solution has the following properties:

| Sp. Gr. | 1.61 |
|---|---|
| Viscosity | 40–50 cp at 25.5 °C |
| pH | less than zero |
| Chemical Analysis: | |
| $ZrO_2$ | 462 gm/liter |
| $Y_2O_3$ | 38.4 gm/liter |
| Cl | 189 gm/liter |
| Rare Earth Oxide | 1.8 gm/liter |

B. Representative Preferred Method of Producing Yttria-Stabilized Zirconia Powder For Use In Zirconia Cement 1. Contact sheets of wood pulp, by immersion, in an aqueous solution of zirconium oxychloride and yttrium chloride and having a specific gravity of 1.35 and containing 250 gm/liter $ZrO_2$, 20 gm/liter $Y_2O_3$ and rare earth metal oxide, and 160 gm/liter chloride ion.

2. After thorough saturation of the solution into the wood pulp, (time may vary from several minutes to a day or more) the pulp is centrifuged of excess solution, i.e., solution not absorbed into the pulp.

3. The wet, salt-loaded pulp is next ignited in a commercial gas-fired incinerator. During burning the material reaches a maximum temperature of around 1,800°F. for several minutes.

4. After the charge has completely burned, the white ash is collected. The ash at this point is a soft, fluffy material composed of loosely agglomerated crystallites of fully stabilized zirconia. Particle sizes of the crystallites, as determined by X-ray diffraction line broadening analysis and electron microscopy, are in the 200–500 Angstrom range. The ash is next broken down to about 100 mesh size in a blender or pulverizer and wet milled for 4–8 hrs. Zirconia beads have been used as the grinding media in small preparations, but other hard grinding media are acceptable. The wet milled powder passes (more than 98 percent) through a 10 micron sieve and has a mean particle size under one micron. Typical analysis of fully-stabilized wet-milled powder is:

| | |
|---|---|
| $ZrO_2$ Content | 92.70 wt % |
| $Y_2O_3$ Content | 3.53 " |
| *R.E.$_2$O$_3$ Content | 2.42 " |
| $Fe_2O_3$ Content | 0.16 " |
| Cl Content | 0.09 " |
| Moisture Content | 0.11 " |
| Loss on Ignition | 0.24 " |

*Rare Earth Oxide Content

For the preparation of sub-micron sized metal oxide powders other than zirconia for use in the zirconia cement, compounds of other metals can be used to impregnate the wood pulp or other preformed polymeric material such as cotton linters. For instance, aqueous solutions of one or more compounds of yttrium, thorium, beryllium, cerium or other rare earth metal, hafnium, or the like, can be used.

Thereafter, the process employed is analogous to that illustrated above wherein the loaded polymer is ignited to burn off the polymer and produce fragile agglomerates of sub-micron sized metal oxide particles.

Example 2

A fibrous zirconia coated thermocouple protection tube for use in molten aluminum is prepared as follows: A 2-foot length of 446 stainless steel schedule 40, one-quarter inch IPS pipe is plugged at one end by hot swaging and welding and threaded at the other end with conventional pipe threads. The protection tube, thus prepared, is sandblasted and washed with trichloroethylene. A 2 to 3 mil coating of NBS A-418 enamel is applied by dipping the prepared and cleaned protection tube into a slip having a specific gravity of 1.55-1.60. The enamel slip is purchased from the Glidden-Durkey Division, SCM Corporation, and diluted with water to obtain the desired specific gravity. The enamel coating is baked at a temperature of 1,880°F for 6 minutes.

Once cooled, the enameled tube is wrapped with two layers of ⅜-inch wide bias braided, yttria-stabilized zirconia tape. The layers are applied in a spiral winding with the direction of winding of the two layers opposing one another. Before winding, the tape is impregnated with a cement prepared from zirconium hydroxychloride, yttrium chloride and fully stabilized (with yttria) zirconia powder. The impregnation is accomplished by passing the tape through an agitated bath of zirconia cement prepared as described in Example 1. The cement contains 1,360 grams of zirconia powder per liter of the liquid component. The tape is passed through compression rollers after immersion in the cement, and is then wound on the enameled tube. Once wound on the tube the pasty tape-cement combination is padded in place by stroking with the fingers while the tube is rotated. The coated tube is gently rolled between rubber rollers to compact the coating. It is then allowed to air-dry, after which it is heated at a rate of approximately 230°F. per hour to a final temperature of 1,880°F. The coated tube is held at 1,880°F. for a period of 10 minutes, and is then allowed to quickly cool to room temperature in air. In subsequent tests the rate of heating was not found to be a critical parameter.

Thermocouple protection tubes fabricated by this procedure were found to have excellent resistance to molten aluminum. In laboratory tests and in tests simulating commercial usage such tubes were found to be capable of surviving immersion in dross-covered molten aluminum for as long as 800 hours and at temperatures as high as 1,700°F with no apparent damage to the coating.

An important feature of the invention is the maintenance of contact between the zirconia and the porcelain enamel during the firing stage wherein the enamel is fused and then re-solidified. When the zirconia employed is fibrous zirconia impregnated with zirconia cement, the requisite contact can be achieved by maintaining moderate pressure on the zirconia while the cement is drying. Thus, the coated metal article can be tightly wound with an organic fiber such as rayon while the article is heated to about 212°F. in order to volatilize the water contained in the cement. The thus-dried cement maintains the zirconia coating in contact with the porcelain during the subsequent heating step during which the zirconium compound from the liquid component of the cement is converted to zirconia, the organic fiber over-wrap burns off, and the porcelain enamel is fused.

An alternative manner of providing pressure on the zirconia while the liquid component in the cement is being dried is to insert the coated article in a flexible bladder (for instance, one made of silicone rubber) the inner surface of which has the same shape as the exterior of the coated article. Pressure is maintained on the outside of the bladder (by means of air, a heated liquid medium, or the like) while the article is heated to, e.g., 250° to 300°F. to dry the cement. Pressures of, for instance, 100 to 200 psi are suitable for this purpose. Higher pressures up to, for instance, 500 to 1,000 psi, can be used, if desired.

When the cement is dried, means should be provided to permit volatiles to escape. When the coated article is inserted in a bladder for drying, the article can be provided with a fibrous overwrap of, for example, rayon fibers. This overwrap serves to protect the uncured zirconia coating, as well as to provide a path through which volatiles can escape. The overwrap burns off during the firing step, as is discussed above.

In order to increase the hardness of the coatings of fibrous zirconia (whether or not impregnated with the above-described zirconia cement), the fibrous zirconia coated articles of the invention can be impregnated one or more additional times with the liquid component of the above-described zirconia cement. The additional impregnation(s) can be carried out as follows:

The zirconia-coated article is immersed in the liquid containing the zirconium compound, a vacuum is pulled in order to eliminate air from the zirconia coating, and the vacuum is then released, thereby enabling the liquid to penetrate the pores in the coating. Excess liquid is wiped off of the surface, the liquid is dried to remove the solvent (preferably by heating at moderate temperatures, as discussed above), and then heated to convert the zirconium compound to zirconia. The rate of heating is not critical (after the liquid has been dried). A maximum temperature of from about 1,100° to 1,500°F. should be held for about 1 to 3 hours. This additional impregnation step can be repeated several times, if desired, in order to substantially increase the hardness and lessen the porosity of the zirconia coating.

When drying the above-described liquid component of the zirconia cement (either with or without the refractory powder filler), as a general rule it is preferred to carry out the drying by heating at moderate temperatures rather than air drying at ambient temperature. By so doing, any tendency toward segregation of the zirconium compound and the compound of a metal that forms a stabilizer oxide is kept to a minimum. Maximum stabilization of the zirconia is thereby achieved.

Another method for preventing segregation of the zirconium compound and the stabilizer compound is to add small amounts of aluminum or magnesium to the aqueous solution. For instance, 8 mesh aluminum powder can be added in proportions of from about 0.5 to about 3 weight percent (based on weight of fired oxide content). The aluminum and magnesium metal readily dissolves in acidic aqueous solutions containing for example, zirconium hydroxychloride and yttrium chloride. After dissolution of the aluminum or magnesium, the liquid is then utilized as indicated above, either with or without a filler powder.

The aluminum or magnesium apparently achieves the desired result by preventing crystallization of the zirconium compound as the solution is concentrated during drying. Rather, a gel-like material is formed (perhaps by polymerization of the metal salts present) that becomes a glassy, rather than crystalline, solid. By this means, segregation of the zirconium compound and stabilizer metal compound is prevented.

Example 3

Zirconia Coating On Hastelloy-X.

A fuel injection nozzle fabricated from Hastelloy-X alloy, and having dimensions of 3/4 inch O.D. × 5 inches long, was coated with a double zirconia tape layer. The nozzle, as received, was first sand-blasted to roughen the surface, and then oxidized at 1,040°C. for several minutes until a uniform golden-colored oxidation layer built up on the surface. Enamel Type A-418 was applied by brushing onto the surface. The enamel was fused by heating 3 min. at 1,040°C. A double spiral wrap of bias-braid zirconia tape impregnated with zirconia cement was applied to the nozzle by the same procedure described in previous examples. A 7 lb. tension was used on the overwrap of yarn to pull down the tape wrap. The cement was dried at 100°C. for 1 hr. It was then cured by heating to 600°C. over a period of 6 hrs., with a 1 hr. hold time at 600°C. The tape surface was sanded smooth, using 180 grip sandpaper, and then was refired at 1,040°C. for 4 min. to form the enamel bond to the tape.

Example 4

Example of a Coated Metal Tube (Inconel X-750).

The following describes the fabrication of a coated Inconel X-750 tube with zirconia tape employing enamel Type A-418 as a bond. The purpose of coating the metal tube with zirconia is to provide a thermal insulation layer for slowing the rate of heat lost to the walls of the tube. A 6 inch length of 3/8 inch O.D. × 0.040 inch wall thickness of Inconel X-750 was lightly sand blasted and then oxidized at 1,040°C. for 4 minutes. (It had been found that, in order to get a good enamel bond on Inconel X-750 and Hastelloy-X, a preoxidation was necessary to build up a thin oxide layer. This oxide coating turns the metal to a light golden color.) Enamel A-418 was next sprayed on the outside of the tube. After drying, the enamel was fused by heating 3 minutes at 1,040°C. Bias-braid tape was next saturated with zirconia cement, same as used in the Example for thermocouple protection tubes, and wound around the tube in a spiral configuration. Four layers of bias-braid tape were applied to the tube to build up the thickness to 0.050 inches. Untreated rayon yarn was spirally wrapped under 3 lb. tension over the wet tape to make the tape composite more dense. After drying at room temperature overnight, the piece was fired to a temperature of 1,000°F. over a period of 6 hrs., and held for 1 hr. It was next heated to 1,040° C. for 5 minutes to refuse the enamel. The outside surface of the tape was sanded smooth with 180 grit sandpaper. The 50 mil thick zirconia coating was found to be effective in keeping the metal tube cool when placed in a high velocity air stream which had been heated to 2,300°–2,500°F.

The foregoing disclosure was exemplified by example and/or enumeration several specific metals and alloys thereof that can be used in the invention. The invention is not limited to such metals. Any metal having a melting point high enough to permit coating with a porcelain enamel can be used in the invention. Preferably, the metal has a melting point of at least about 1,100°F., and more preferably, of at least about 1,500°F.

What is claimed is:

1. A thermocouple protection tube suitable for use in molten aluminum comprising a metal tube to which is bonded a coating of porcelain enamel, said enamel having bonded to its outer surface a mixture of fibrous zirconia and a refractory powder in a matrix of microporous zirconia, wherein the zirconia mixture is bonded to said metal tube through said porcelain enamel.

2. The thermocouple protection tube of claim 1 wherein the zirconia is stabilized.

3. The thermocouple protection tube of claim 2 wherein the stabilization is effected with yttria.

* * * * *